(12) United States Patent
Fukuyama et al.

(10) Patent No.: US 6,259,179 B1
(45) Date of Patent: Jul. 10, 2001

(54) MAGNETIC BEARING SYSTEM

(75) Inventors: Hiromasa Fukuyama; Takeshi Takizawa, both of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/440,115

(22) Filed: Nov. 15, 1999

(30) Foreign Application Priority Data

Nov. 13, 1998 (JP) .................................................. 10-323176

(51) Int. Cl.[7] ................................. H02K 7/09; H02P 5/28
(52) U.S. Cl. ................................. 310/90.5; 318/798
(58) Field of Search ............................. 310/90.5, 68 B, 310/166, 168; 318/798, 799, 800, 801, 802, 803

(56) References Cited

U.S. PATENT DOCUMENTS

| | | | |
|---|---|---|---|
| 4,983,869 | * 1/1991 | Vaidya et al. | 310/90.5 |
| 4,983,870 | 1/1991 | McSparran | 310/90.5 |
| 5,003,211 | * 3/1991 | Groom | 310/90.5 |
| 5,250,865 | * 10/1993 | Meeks | 310/90.5 |
| 5,264,982 | * 11/1993 | Cox et al. | 361/144 |
| 5,313,399 | * 5/1994 | Beale | 364/463 |
| 5,315,197 | * 5/1994 | Meeks et al. | 310/90.5 |
| 5,491,396 | * 2/1996 | Takahashi et al. | 318/632 |
| 5,686,772 | * 11/1997 | Delamare et al. | 310/90.5 |
| 5,760,510 | * 6/1998 | Nomura et al. | 310/90.5 |
| 5,760,511 | * 6/1998 | Nakagawa et al. | 310/90.5 |
| 5,844,339 | * 12/1998 | Schroeder et al. | 310/90.5 |
| 6,121,704 | * 9/2000 | Fukuyama et al. | 310/90.5 |

FOREIGN PATENT DOCUMENTS 5-17406    3/1993   (JP) .

* cited by examiner

*Primary Examiner*—Elvin Enad
*Assistant Examiner*—Dang Dinh Le
(74) *Attorney, Agent, or Firm*—Crowell & Moring, L.L.P.

(57) ABSTRACT

A magnetic bearing system includes a rotor shaft 1, stationary electromagnetic pole, a radial displacement sensor 5 for detecting the position of the rotor shaft 1 with respect to the electromagnetic polarity, and a control circuit 220 which supplies a control current in accordance with an output from the radial displacement sensor 5. A permanent magnet 20 is disposed in the magnetic bearing so as to constitute a portion of a magnetic member 10 which forms a magnetic circuit between the rotor shaft 1 and the electromagnetic pole. The position where a balance exists between an attraction force developed in the permanent magnet 20 and static force, which acts on the rotor shaft 1 when no load is imposed on the rotor shaft 1, is set as a target position for the rotor shaft 1.

5 Claims, 3 Drawing Sheets

MAGNETIC BEARING SYSTEM

BACKGROUND OF THE INVENTION

1. Field of the Invention

The present invention relates to a magnetic bearing for rotatably supporting a rotor without involvement of any physical contact therewith, by utilization of magnetic attraction force.

2. Description of the Related Art

An example of conventional magnetic bearing is described in, for example, Japanese Patent Examined Publication (Kokoku) No. Hei-5-17406. In this example, a radial magnetic bearing comprises a radial stator and a rotor. The radial stator is configured so as to be able to comprise three pairs of magnetic poles, and each pair has windings coiled so as to form a north pole and a south pole in the form of a horseshoe within a radial plane. The rotor is attached to a rotor shaft and is formed by stacking annular steel plates into a multilayer element. In this example, a large bearing loss, which will be described later, arises in the radial magnetic bearing. The electromagnetic polarity of the radial magnetic bearing alternates with respect to the direction of rotation, so that great hysteresis and eddy-current losses develop in the multilayered annular steel plates attached to the rotor shaft, thus generating heat in the rotor shaft. Such heat generation results in a loss of control power supplied to the magnetic bearing.

A radial magnetic bearing which prevents such a power loss is described in U.S. Pat. No. 4,983,870, wherein the electromagnetic polarity of the radial magnetic bearing does not alternate with respect to the direction of rotation. An eddy current loss is usually caused by a change in the intensity of the magnetic field stemming from repetition of regions where magnetic polarity exists and regions where magnetic polarity does not exist, within a peripheral surface of the rotor shaft with respect to the circumferential direction. In the foregoing radial magnetic bearing, the multilayered electromagnetic steel plates—through which an eddy current passes—are isolated from one another with respect to the circumferential direction. Hence, substantially no eddy current develops in the multilayered electromagnetic steel plates, thus considerably reducing a bearing loss.

However, a large current loss still exists even in the above radial magnetic bearing. This type of radial magnetic bearing involves constant flow of a bias current which provides a bias magnetic flux in order to effectively prevent an eddy current loss, thus resulting in an additional power loss.

A conceivable measure for eliminating a necessity for the bias current to flow through the magnetic bearing is a magnetic bearing which uses a permanent magnet for generating a bias magnetic flux. One example of such a magnetic bearing is described in Japanese Utility-Model Unexamined Publication No. Hei-2-87120; namely, a thrust magnetic bearing which employs a permanent magnet so as to form a portion of an electromagnetic pole, as means for eliminating a necessity for inducing a bias current for generating a bias magnetic flux. Another conceivable measures for embodying a radial magnetic bearing employing a magnet for diminishing a bearing loss is to apply the thrust magnetic bearing, as described in Japanese Utility-Model Unexamined Publication No. Hei-2-87120, which supplies a bias magnetic flux through use of a permanent magnet, to the radial magnetic bearing as described in U.S. Pat. No. 4,983,870.

In a commonly-known control circuit for controlling the above-described type of magnetic bearing, which uses a permanent magnet, a compensation circuit is activated such that an object of control is to be positioned in accordance with a position instruction value, and a control current supplied from a power amplifier to a magnetic coil is adjusted to an appropriate value. In this type of control circuit, the control current flowing to the magnetic coil is integrated, and the integration result is fed back to the compensation circuit, thus shifting the object of control to a position where a balance exists between the gravitational force acting on the object and the attraction force exerted by the magnet. In the end, the electric current flowing through the magnetic coil is made virtually zero.

In the magnetic bearing, which employs a magnet and the above-described control circuit, the rigidity of the bearing is zero. If variable load, such as cutting load corresponding to continuous imparting of static load, acts on the shaft, the position of the shaft gradually varies. In contrast, if dynamic load acts on the shaft, the position of the shaft is changed, thus resulting in the probability of an accident such as a collision between the rotor shaft and the stator.

FIG. 3 is a block diagram showing a control circuit for use with a magnetic bearing, which uses a magnet, described in Japanese Utility-Model Unexamined Publication No. Hei-5-10822, which serves as an example of the control circuit for use with the conventional magnetic bearing using a magnet. In this control circuit, a compensation circuit 301 outputs an instruction signal to a power amplifier circuit 302, which in turn actually drives an object of control 303. At this time, a VZP feedback circuit 304 is activated, and a load signal is integrated by an integrator 305, to thereby control a load current signal so as to make the load current signal zero. An amplitude limit circuit 306 and a gain setting circuit 307 control a feedback to be output from the VZP feedback circuit 304 so as not to become excessive, thus preventing an accident, such as a collision between the rotor shaft and the stator, which would otherwise be caused when a static variable load greater than a predetermined level is imparted to the shaft. The feedback signal from the VZP feedback circuit 304 and a displacement signal 308 are negative-feedbacked to the compensation circuit 301.

If variable load exceeding the range of VZP operation is imparted to the shaft, the position of the shaft becomes undefined within a predetermined range, as a result of which the control circuit encounters difficulty in retaining the shaft at a precise target position.

SUMMARY OF THE INVENTION

In view of the above problems, the object of the present invention is to provide a magnetic bearing system which obtains power-saving and has high rigidity and can retain a shaft at a precise target position.

To solve the problems involved in the related art, the present invention provides a magnetic bearing system including a rotor shaft, stationary electromagnetic pole, a displacement sensor for detecting the position of the rotor shaft with respect to the electromagnetic polarity, and a controller which supplies a control current in accordance with an output from the displacement sensor, a permanent magnet being disposed in a portion of a magnetic member forming a magnetic circuit between the rotor shaft and the electromagnetic pole, wherein a position where a balance exists between an attraction force developed in the permanent magnet and static force, which acts on the rotor shaft when no load is imposed on the rotor shaft, is set as a target position of the control circuit.

In the magnetic bearing system of the present invention, a position where a balance exists between an attraction force developed in the permanent magnet and a static force, which acts on the rotor shaft when no load is imposed thereon, is set as a target position of the control circuit. Accordingly, when no load is imposed on the rotor shaft, the position control of the rotor shaft is effected in a power-saving manner. Even when a certain degree of load is imposed on the rotor shaft, the rotor shaft can be retained at the precise target position.

For example, at the time of activation of the magnetic bearing system, the rotor shaft is levitated at a specific target position. Feedback is effected on the basis of an integrated value of a current, such that the D.C. component of the current flowing through the electromagnetic coil becomes zero. The target position, which is achieved by the control circuit at this time, is stored as a levitated position. Subsequently, the position of the rotor shaft can be controlled, with the levitated position serving as a target position.

DETAILED DESCRIPTION OF THE PREFERRED EMBODIMENT

Figure 1:
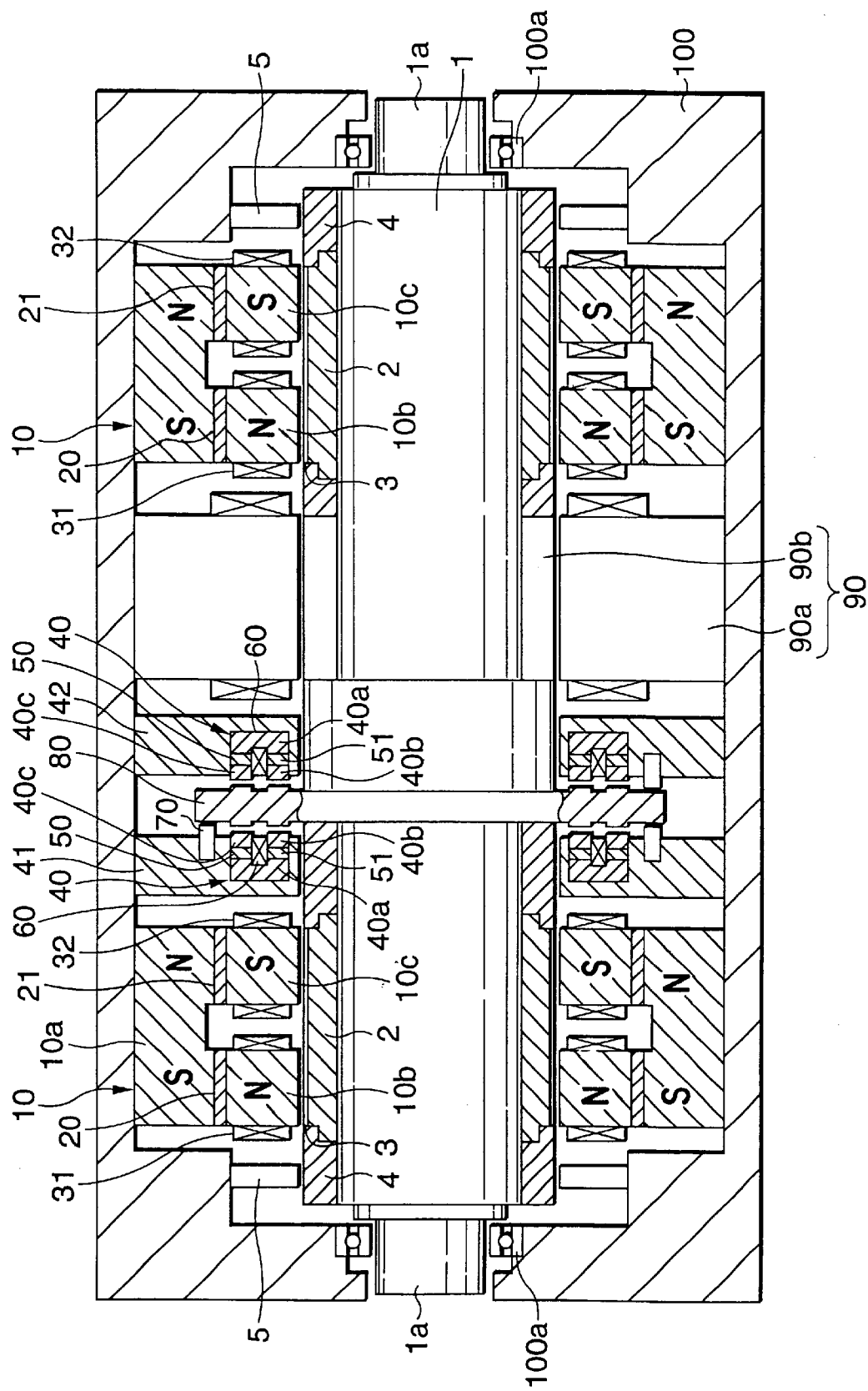
FIG. 1 is a cross-sectional view for describing the internal structure of a main body of a magnetic bearing according to an embodiment of the present invention.

An embodiment of the present invention will be described with reference to the accompanying drawings. FIG. 1 is a cross-sectional view taken along the axis of the main unit of a magnetic bearing of the embodiment.

On a rotor shaft 1 rotatably supported within a housing 100, a flange 80 is formed in substantially the longitudinal center so as to extend in a radial direction and constitute a portion of a thrust magnetic bearing. Rotor cores 2, which constitute a portion of the radial magnetic bearing, are fitted around the outer periphery of the rotor shaft 1 at its opposite axial ends. Each of the rotor cores 2 is constituted by stacking, in the circumferential direction of the rotor shaft 1, I-shaped magnetic steel plates into a multilayer element. A retaining member 3 is disposed on the outer periphery of each of the rotor cores 2, and the rotor cores 2 are tightly fastened by means of the retaining members 3. Further, a mount ring 4 is provided on each of the rotor cores 2, the mount rings 4 being disposed on opposite axial ends of the rotor shaft 1, and the rotor cores 2 are secured to the rotor shaft 1 by means of the mount rings 4.

Four stator cores 10 are disposed at uniform intervals along the circumference of the housing 100 so as to be located outside of the rotor cores 2 with respect to the radial direction. each stator core 10 constitutes a portion of the radial magnetic bearing and is constituted by stacking substantially U-shaped electromagnetic steel plates into a multilayer element. A minimally sufficient stator core may be embodied by use of three stator cores 10, and the stator core 10 is a magnetic member. Each stator core 10 includes a main body 10a and two yokes 10b and 10c, which extend from the main body 10a in a radially inward direction. A plate-like permanent magnet 20 for generating a bias magnetic flux is interposed between the yoke 10b and the main body 10a, and another plate-like permanent magnet 21 is interposed between the yoke 10c and the main body 10a. The permanent magnets 20 and 21 are opposite in polarity with respect to the radial direction. Further, an excitation coil 31 for controlling a magnetic flux is wound around the yoke 10b, and an excitation coil 32 is wound around the yoke 10c. The surface of the stator core 10 facing the rotor core 2 serves as an electromagnetic pole. Radial displacement sensors 5 are disposed at opposite axial ends of the rotor shaft 1 within the housing 100 so as to face with each other, thus detecting the position of the rotor shaft 1 with respect to its radial direction.

The bearing main body further includes an annular member 40, two annular permanent magnets 50 and 51, an excitation coils 60, and an axial displacement sensor 70, so as to constitute a portion of the thrust magnetic bearing. The annular member 40 is formed from magnetic material, have a C-shaped cross section, and is disposed concentrically with the rotor shaft 1 on either side of the flange 80 formed on the rotor shaft 1 so as to face each other, with the flange 80 interposed therebetween. The pair of annular permanent magnets 50 and 51 are embedded in the annular members 40 in such a manner as to be concentrically arranged with each other with respect to the radial direction. Further, the excitation coil 60 is wrapped within a groove formed in the annular member 40. The axial displacement sensor 70 detects the position of the flange 80 with respect to the axial direction.

The annular member 40 includes a disk-shaped main body 40a, a small-diameter annular yoke 40b protruding from the main body 40a in the axial direction, and a large-diameter annular yoke 40c protruding from the main body 40a in the axial direction. One of the annular members 40 is attached to the housing 100 by means of a support member 41, and the other annular member 40 is attached to the housing 100 by means of a support member 42. The permanent magnet 50 interposed between the large-diameter annular yoke 40c and the main body 40a and the permanent magnet 51 interposed between the small-diameter annular yoke 40b and the main body 40a are opposite in polarity with respect to the axial direction. The axial displacement sensor 70 is disposed on the support member 41 so as to face one side of the outer periphery portion of the flange 80.

Small-diameter sections 1a are formed on opposite ends of the rotor shaft 1 with respect to the axial direction, and a touch-down bearing 100a, which is usually spaced away from the small-diameter section 1a with respect to the radially outward direction, is mounted on the housing 100 so as to face the corresponding small-diameter section 1a. A stator 90a is disposed at substantially the longitudinal center of the housing 100, and a rotor 90b is fitted around the rotor shaft 1 so as to face the stator 90a. A drive motor is constituted of the stator 90a and the rotor 90b in combination.

Figure 2:
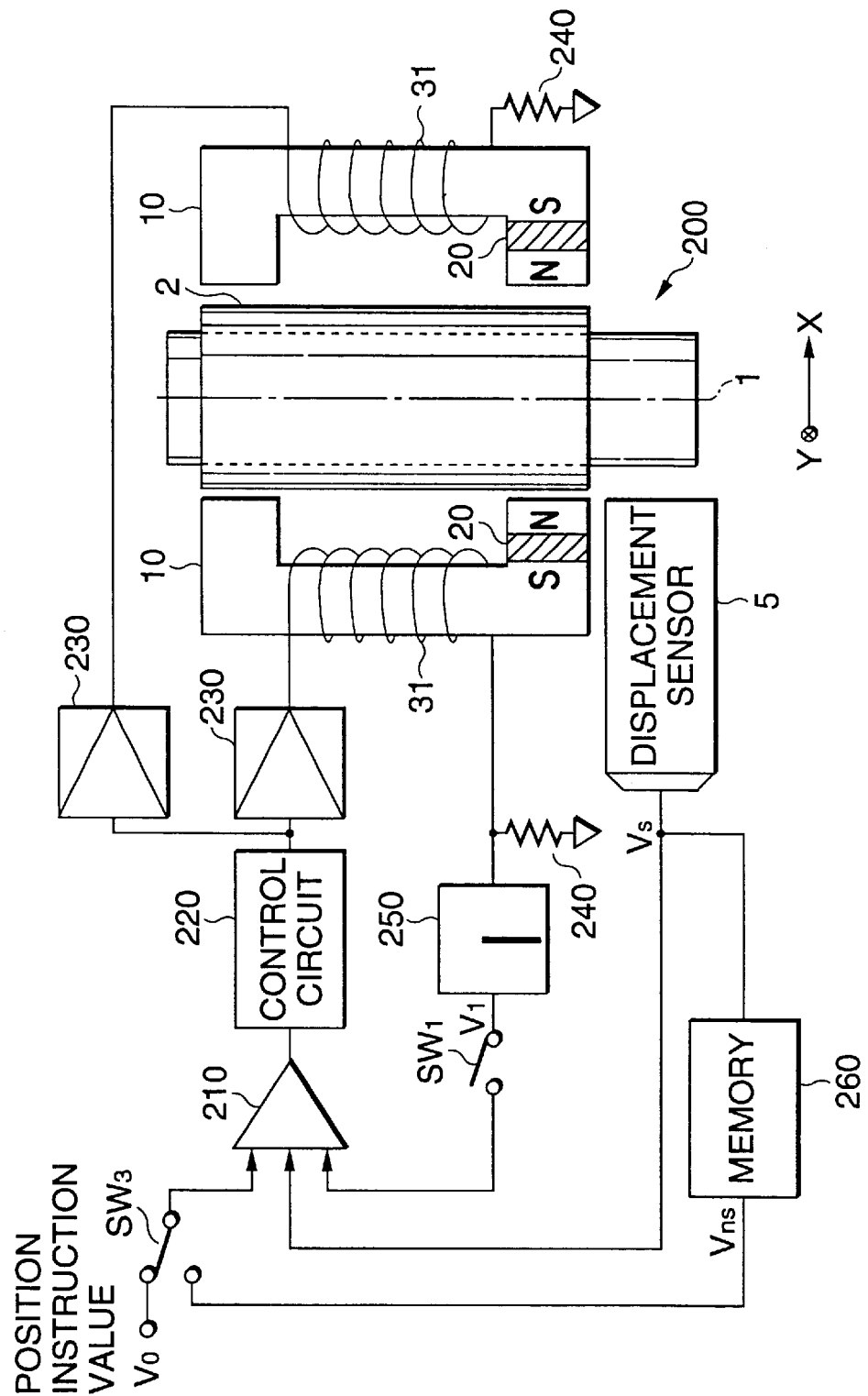
FIG. 2 is a schematic diagram for describing the configuration of a drive circuit for driving the main body shown in FIG. 1.
Figure 3:
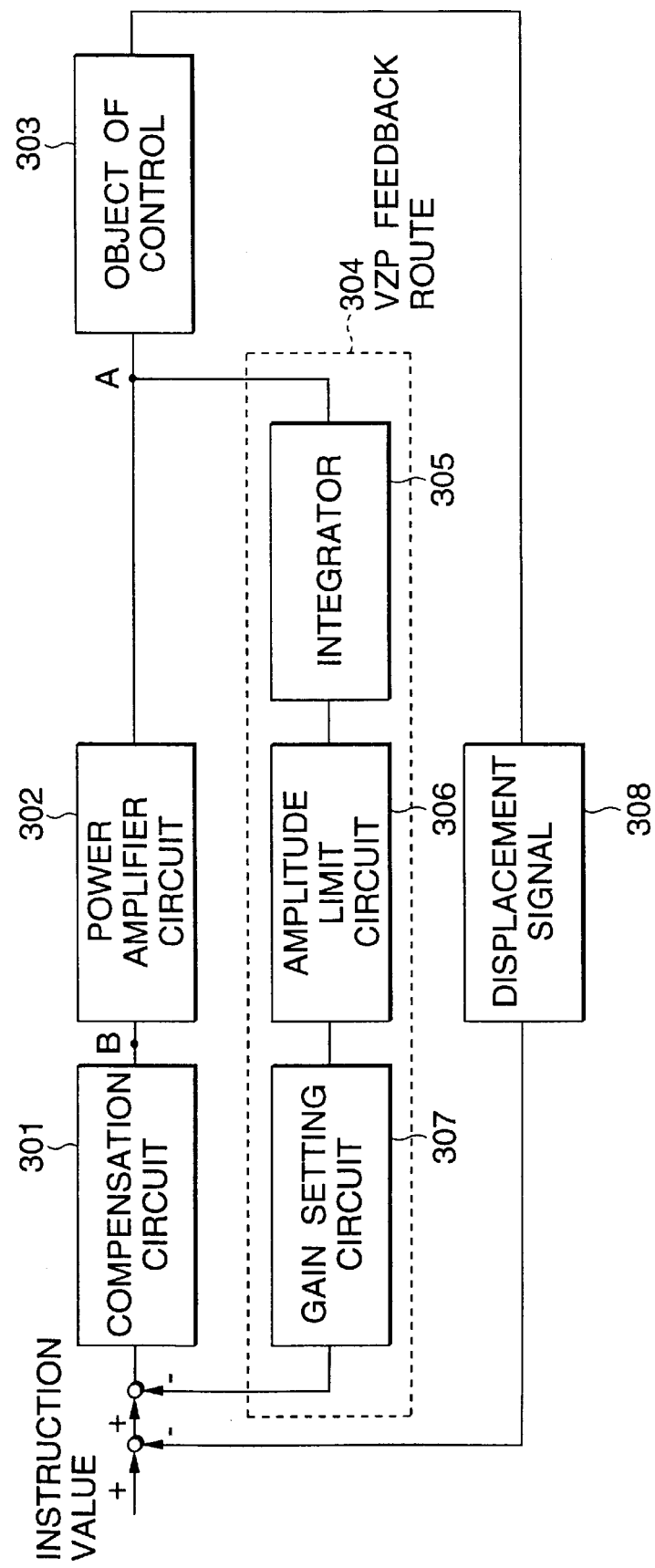
FIG. 3 is a block diagram for describing a drive circuit for driving a conventional magnetic bearing system.

FIG. 2 is an explanatory view for describing a drive circuit of the main body shown in FIG. 1. A radial magnetic bearing 200 shown in FIG. 2 corresponds to one of the magnetic bearings of the main body shown in FIG. 1, which magnetic bearing comprises the magnetic bearing elements 2, 10, 20, 21, 31, and 32. The radial magnetic bearing 200 is simplified as a conceptual structure. The radial magnetic bearing 200 includes the rotor core 2 to be fitted around the rotor shaft 1, the stator cores 10 disposed opposite the rotor core 2, the permanent magnets 20 embedded in the corresponding stator cores 10, and the excitation coil 31 wound around each of the stator cores 10.

The drive circuit includes an operation circuit 210 which receives a position instruction value; a control circuit 220 which produces a control signal upon receipt of a differential signal or the like output from the operation circuit 210; a power amplifier 230 which supplies power to the excitation coils 31 on the basis of the output from the control circuit 220; an integration circuit 250 which integrates the current supplied to the excitation coil 31 and produces an electric signal corresponding to the integration result; and memory 260 capable of retaining a position signal output from the radial displacement sensor 5, as required. A switch SW1 shuts off or permits flow of a feedback signal output from the integration circuit 250 to the operation circuit 210. A switch SW3 selectively connects to the operation circuit 210 either the position instruction value entered from the outside or the position signal stored in the memory 260. Operation timings of the switches SW1 and SW3 and the operation timing of the memory 260 are controlled by an unillustrated main controller.

In a case where a position control voltage V0 is input as a position instruction value entered from the outside in accordance with a result of setting of the switch SW3, if the switch SW1 is in the OFF position, the operation circuit 210 outputs, to the control circuit 220, a difference (V0−Vs) resulting from subtraction, from the position control voltage V0, of a position signal voltage Vs corresponding to the position signal output from the radial displacement sensor 5. In contrast, if the switch SW1 is in the ON position, a corrected value (V0−V1) is determined by subtracting an integrated value V1 of the electric signal output from the integration circuit 250, from the position control voltage V0. Subsequently, a position signal voltage Vs output from the radial position sensor 5 is subtracted from the corrected value (V0−V1), to thereby output a difference signal {(V0−V1)−Vs} to the control circuit 220. If a balanced position voltage Vns, which corresponds to the position signal stored in the memory 260, is input to the operation circuit 210 by means of setting the switch SW3, the switch SW1 is in the OFF position. Accordingly, a difference value, which is determined by subtracting, from the balanced position voltage Vns read from the memory 260, the position signal voltage Vs output from the radial displacement sensor 5, is input to the control circuit 220.

On the basis of the difference signals (V0−Vs) and {(V0−V1)−Vs} output from the operation circuit 210, the control circuit 220 determines allocation of an electric current to the power amplifier 230 and the magnitude of the electric current, by means of computation.

The integration circuit 250 produces the D.C. component of the electric current to be supplied to the excitation coils 31 as the integrated value V1 of the current.

The memory 260 includes a sample-and-hold circuit. The balanced position voltage Vns, which is determined by slicing or averaging the position signal voltage Vs output from the radial displacement sensor 5 at a required timing, is retained in and output by the memory 260.

The operation of the drive circuit shown in FIG. 2, that is, the operation of the magnetic bearing of the present embodiment, will now be described.

In a first phase, the switch SW1 is switched to the OFF position, and the switch SW3 is connected to the position control voltage V0, thereby permitting input of the position control voltage V0 from the outside by way of the switch SW3. As a result, the rotor shaft 1 is levitated to an appropriate target position corresponding to the position control voltage V0 and is retained at this target position regardless of the external force exerted on the rotor shaft 1 (this state is referred to as a "position-controlled state"). At this time, the difference (V0−Vs) resulting from subtraction of the position signal voltage Vs from the position control voltage V0 is input to the control circuit 220 for feed back control. In this position-controlled state, the electric current supplied to the excitation coils 31 usually contains a large D.C. component, thus resulting in an increase in power consumption.

In a second phase, the switch SW1 is switched to the ON position, and the integration circuit 250 is activated, whereby the bias integrated voltage V1 output from the integration circuit 250 is also fed back to the operation circuit 210 by way of the switch SW1. As a result, the difference signal {(V0−V1)−Vs} is input to the control circuit 220. The difference value (V0−V1) resulting from correction of the difference signal {(V0−V1)−Vs} remains changed until the D.C. component of the electric current supplied to the excitation coils 31 converges to zero. In short, as a result of the position control voltage V0 being input to the control circuit 220 in the first stage, the bias integrated voltage V1 increases or decreases until the D.C. component of the current developed in the excitation coils 31 is canceled, and then becomes stable. In such a stable state, a balance exists between the load exerted on the rotor shaft 1 and the attraction force of the permanent magnets 20, and the D.C. component of the load current is zero (this state is called a "zero-power state"). In this zero-power state, the electric current flows through the excitation coils 31 in trace amounts sufficient for effecting only differentiation for preventing minute variations in the rotor shaft 1, thus resulting in very low power consumption. In this zero-power state, if a force acting on the rotor shaft 1 from the outside is zero, the rotor shaft 1 is retained at its original position (called a "zero-force position"). In contrast, if static force acting on the rotor shaft 1 increases in the zero-power state, the rotor shaft 1 is shifted steadily from the zero-force position. In the second phase, in order to retain the rotor shaft 1 at the zero-force position, exertion of static force on the rotor shaft 1 is prevented. At the end of the second phase, the balanced position voltage Vns (corresponding to the zero-force position) corresponding to the position signal voltage Vs, which is output from the radial displacement sensor 5 in the zero-power state, is held in the memory 260.

In a third phase, the switch SW1 is switched to the OFF position, and the switch SW3 is connected to the memory 260. As a result, the balanced position voltage Vns, which is a new position control voltage, is input to the operation circuit 210 by way of the switch SW3. Consequently, the rotor shaft 1 remains levitated in the zero-force position corresponding to the balanced position voltage Vns and is held in the zero-force position regardless of whether or not external force acts on the rotor shaft 1 (this state is called a "minimum power position-controlled state"). At this time, the difference (Vns−Vs), which results from subtraction of the position signal voltage Vs from the balanced position voltage Vns, is input to the control circuit 220, where the difference (Vns−Vs) is used for feedback control. In the minimum power position-controlled state, if no static external force acts on the rotor shaft 1, the magnetic bearing is in the previously-described zero power state, wherein no D.C. current develops in the excitation coils 31. In contrast, even if static external force acts on the rotor shaft 1, the D.C. current developed in the excitation coils 31 is minimized, and the rotor shaft 1 is retained at the zero-force position. In short, power-saving, precise position control of the rotor shaft is effected while the magnetic bearing retains high rigidity.

In the foregoing description, the position of the rotor shaft 1 with respect to a specific direction (i.e. the X direction) is controlled on the basis of the output from the single radial displacement sensor 5. The portion of the bearing facing the rotor shaft 1 with respect to the orthogonal direction (i.e., the Y direction) is also subjected to the same control. Consequently, the position of the rotor shaft 1 is retained in the minimum power position-controlled state within the X-Y plane.

The foregoing description has explained position control of a single radial magnetic bearing. So long as each of the two radial magnetic bearings shown in FIG. 1 is equipped with and controlled by the previously-described drive circuit, there can be embodied a more power-saving, high-rigidity, and precise magnetic bearing.

A more power-saving, high-rigidity, and precise thrust magnetic bearing can be embodied, so long as the thrust bearing is provided with the previously-described drive circuit and is controlled by the same.

Although the present invention has been described by reference to the embodiment, the present invention is not limited to the embodiment. For instance, in the previous embodiment, the position of the rotor 1 is controlled through use of the difference (V0–Vs), which results from subtraction from the position control voltage V0 of the position signal Vs output from the radial displacement sensor 5. Needless to say, various other types of position control based on, for example, PID or a modern control theory, can be applied to the present invention.

In the previous-described embodiment, the output from the radial displacement sensor 5 is input directly to the operation circuit 210. However, any appropriate switch may be interposed between the radial displacement sensor 5 and the operation circuit 210. In this case, the output from the radial displacement sensor can be input to the operation circuit 210 by switching the switch to the OFF position in the first and second phases, and switching the switch to the ON position in the third phase.

As is evident from the foregoing description, in the magnetic bearing system of the present invention, the position where a balance exists between an attraction force developed in a permanent magnet and a static force, which acts on a rotor shaft when no load is imposed on the rotor shaft, is set as a target position for the rotor shaft. Therefore, when no load is imposed on the rotor shaft, the position control of the rotor shaft is effected in a power-saving manner. Even when a certain degree of load is imposed on the rotor shaft, the rotor shaft can be retained at the precise target position.

The present disclosure relates to the subject matter contained in Japanese patent application No. Hei. 10-323176 filed on Nov. 13, 1998 which is expressly incorporated herein by reference in its entirety.

What is claimed is:

1. A magnetic bearing system comprising;
   a rotor shaft;
   a stationary electromagnetic pole;
   a displacement sensor for detecting the position of said rotor shaft with respect to said electromagnetic pole;
   a permanent magnet disposed in a portion of a magnetic member forming a magnetic circuit between said rotor shaft and said electromagnetic pole; and
   a controller which supplies a control current to an excitation coil of said electromagnetic pole in accordance with an output from said displacement sensor, to thereby perform a position control of said rotor shaft, said controller comprising;

a difference operation circuit which operates a difference signal between an input signal for providing a target position of said rotor shaft and a displacement sensor signal output from said displacement sensor, and outputs said difference signal;
   a control circuit generating a control signal on the basis of said difference signal, said control signal corresponding to the control current to be supplied to said excitation coil of said electromagnetic pole so as to retain said rotor shaft in the target position;
   an integration circuit integrating said control current passing through said excitation coil to generate a D.C. component signal of said control signal; and
   a memory retaining and outputting a balanced position signal obtained by averaging said displacement sensor signals when no load is subject to said rotor shaft,
   wherein an initial position instruction value providing an initial target position of said rotor shaft is set to a position where a balance exists between an attraction force developed in said permanent magnet and a static force which acts on said rotor shaft when no load is imposed on said rotor shaft, and
   wherein said difference operation circuit outputs a first difference signal by providing as said input signal, said initial position instruction value,
   said difference operation circuit outputs a second difference signal by inputting said D.C. component of said control current obtained on the basis of said first difference signal to said difference operation circuit and providing as said input signal, a correction value which subtracts said D.C. component from said initial position instruction value, whereby said rotor shaft is position-controlled on the basis of said second difference signal,
   said memory retains said balanced position signal of said rotary shaft at the time of the position control on the basis of said second difference signal, and further
   after the position control on the basis of said second difference signal, said difference operation circuit outputs a third difference signal by providing as said input signal, said balanced position signal, whereby said rotor shaft is position-controlled on the basis of said third difference signal.

2. A magnetic bearing system according to claim 1, wherein said magnetic member comprises;
   a main body;
   two yoke portions extending from said main body inwardly in a radial direction of said rotor shaft; and
   said permanent magnets provided between said main body and said yoke portions,
   wherein said permanent magnets are arranged to be opposite in polarity to each other in the radial direction.

3. A magnetic bearing system according to claim 1, further comprising:
   a thrust magnetic bearing having:
      a flange portion provided in said rotor shaft;
      a pair of annular members concentrically arranged to face both surfaces of said flange portion in an axial direction of said rotor shaft, respectively, said annular member being made of magnetic material having a substantially U-shaped section so as to define a groove portion;
      at least permanent magnet intervened in said annular member in such a manner as to be concentric with said annular member;

an excitation coil wound around said groove portion of said annular member; and an axial displacement sensor detecting an axial position of said flange portion.

4. A magnetic bearing system comprising;

a rotor shaft;

a stationary electromagnetic pole;

a displacement sensor for detecting the position of said rotor shaft with respect to said electromagnetic pole;

a permanent magnet disposed in a portion of a magnetic member forming a magnetic circuit between said rotor shaft and said electromagnetic pole; and a controller which supplies a control current to an excitation coil of said electromagnetic pole in accordance with an output from said displacement sensor, to thereby perform a position control of said rotor shaft, said controller comprising;

a difference operation circuit which operates a difference signal between an input signal for providing a target position of said rotor shaft and a displacement sensor signal output from said displacement sensor, and outputs said difference signal;

a control circuit generating a control signal on the basis of said difference signal, said control signal corresponding to the control current to be supplied to said excitation coil of said electromagnetic pole so as to retain said rotor shaft in the target position;

an integration circuit integrating said control current passing through said excitation coil to operate a D.C. component signal of said control signal; and a memory retaining and outputting a balanced position signal obtained by averaging said displacement sensor signals when no load is subject to said rotor shaft, wherein said input signal of said difference operation circuit includes instruction signal obtained from the outside as the target position of said rotor shaft, said D.C. component signal and said balanced position signal.

5. A magnetic bearing system according to claim 4, wherein said controller includes a switching device switching the input of said instruction signal and said balanced position signal.

* * * * *